Feb. 12, 1952 G. ASHTON 2,585,294
BATCH FEEDING APPARATUS
Original Filed April 25, 1949 2 SHEETS—SHEET 1

GEORGE ASHTON,
INVENTOR.

BY *Knight & Rodgers*

ATTORNEYS.

Feb. 12, 1952     G. ASHTON     2,585,294
BATCH FEEDING APPARATUS
Original Filed April 25, 1949     2 SHEETS—SHEET 2
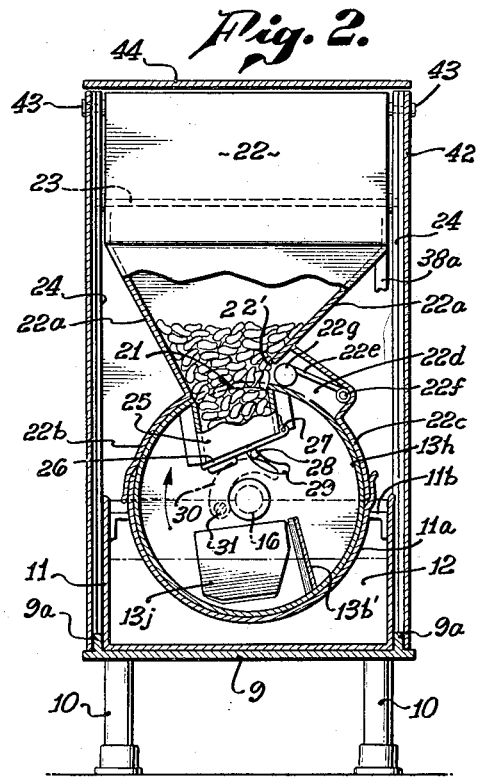
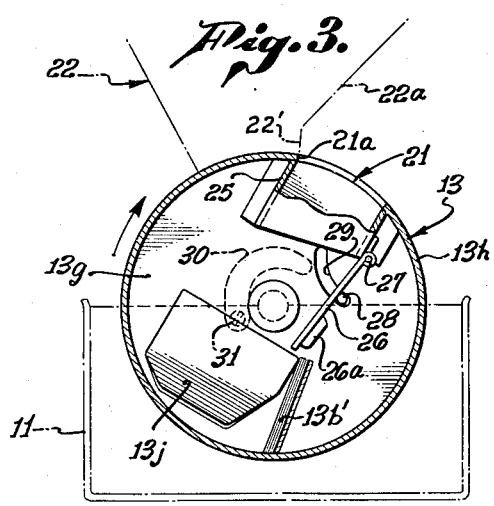
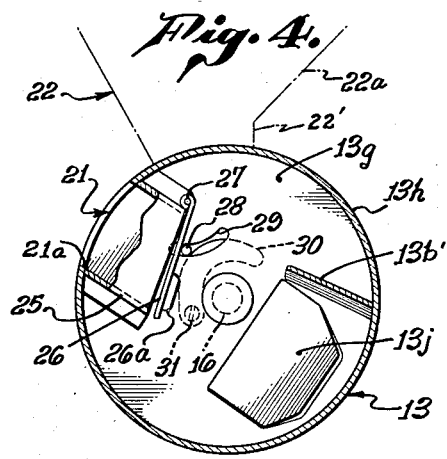
GEORGE ASHTON,
INVENTOR.
BY Knight & Rodgers
ATTORNEYS.

UNITED STATES PATENT OFFICE 2,585,294

BATCH FEEDING APPARATUS

George Ashton, Los Angeles, Calif.

Original application April 25, 1949, Serial No. 89,490. Divided and this application December 26, 1950, Serial No. 202,661

5 Claims. (Cl. 198—53)

The present invention relates generally to batch feeding apparatus, and more particularly to apparatus of this character used to feed edible materials, as nut meats of all kinds, chopped or sliced vegetables, shrimp, or similar food products, into a continuously operating cooker.

This application is a division of my co-pending case Serial No. 89,490, filed April 25, 1949, for "Apparatus for Continuous Cooking." Reference may be made to said parent application for claims to certain subject matter disclosed herein but not claimed, and also for additional description of the features of the cooking apparatus.

The type of cookers with which we are concerned here generally have a continuously rotating cylinder or drum into which the material to be cooked is fed intermittently in small batches, usually of uniform size. The material is initially placed in a hopper disposed above the drum in order to take advantage of gravity to secure flow of material from the hopper into the drum. For various reasons which need not be detailed, a continuous or uninterrupted feed into the rotating drum has objections. It has been found that an intermittent or batch feeding is easier of accomplishment, the batches normally being supplied at regular intervals.

Heretofore considerable trouble has arisen in apparatus of this type because pieces of the edible materials are caught at the point of entry into the drum between the moving wall of the drum and the fixed wall of the hopper or similar member adjacent the drum. Particles so caught are very easily crushed or crumbled into small pieces. This problem is made more difficult of solution because the pieces are much larger in size than the particles of a powdered or granular material so that it is not ordinarily possible to level off a container full of particles by scraping a member over the top of the container. Also the edible materials handled are relatively soft or weak so that they are very easily broken.

Production of a high quality product requires that all the pieces be whole, of uniform size as far as possible, and cooked to a uniform degree. Any small or broken pieces must be removed by hand picking or sorting in order to keep the product at the highest grade. Comparatively small broken pieces usually cook too rapidly and are of such poor quality that they must be discarded completely. The loss of material and the labor required to grade the output may represent a substantial part of the total operating cost; and it is highly desirable that losses from these sources be avoided.

Hence it becomes the general object of my invention to provide batch feeding apparatus that intermittently supplies measured amounts of material to a rotating drum without crushing or breaking any of the pieces.

It is also the general object of my invention to provide apparatus for automatically measuring uniform batches of material and transferring them from a stationary hopper to the interior of a rotating drum, utilizing gravity flow.

How the above and other objects of my invention, as well as others not specifically referred to herein, are attained will be more readily understood by reference to the following description and to the annexed drawings, in which:

Fig. 2 is a vertical transverse section on line 2—2 of Fig. 1 through the feeder;

Figs. 3 and 4 are partly schematic fragmentary sections similar to Fig. 2 showing successive positions of parts of the material feeding apparatus.

Figure 1:
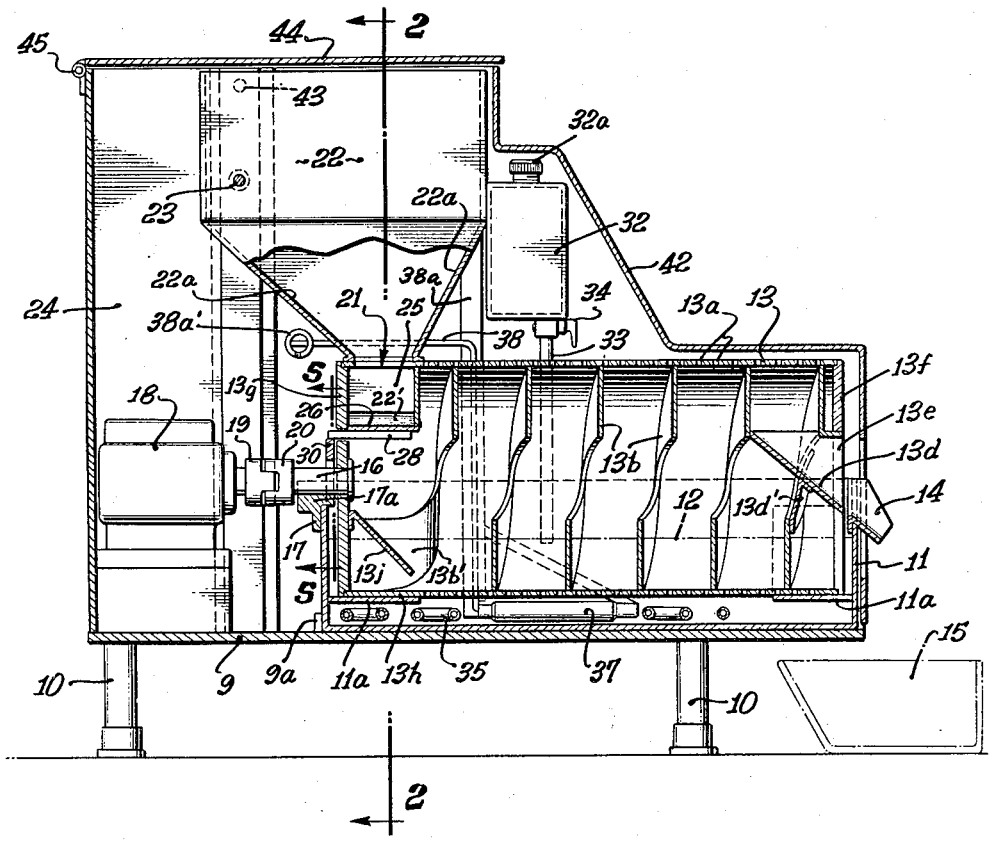
Fig. 1 is a longitudinal vertical median section through a continuously operating cooker illustrating the application thereto of the material feeding device of my invention.

The cooking apparatus into which my invention is incorporated is supported by a base member or plate 9 resting on legs 10. Between transversely spaced longitudinal flanges 9a on the upper face of base 9 is placed a rectangular open-top container 11 for receiving a body 12 of cooking fluid such as vegetable oil or the like, suitable for the desired cooking operation. Within the opposite ends of container 11 are arcuate or semi-circular bearing plates 11a which are welded or otherwise secured to the end walls of the container and also to brackets 11b extending inwardly from the side walls of the container. These bearing plates rotatively receive the exterior end surfaces of a cylindrical member or drum 13 so that the member is partially immersed in the body of cooking liquid 12. Perforations 13a are placed in the wall of drum 13 to permit movement of the cooking fluid into and out of the drum as it rotates. Drum 13 receives the articles of edible material to be cooked, such as nut-meats, at one end in intermittently measured batches, as will be further described. The drum moves this material lengthwise as it rotates by suitable means such as a spiral or helical flight 13b on the interior of cylinder 13. The material to be cooked is charged into drum 13 at one end where it falls into the cooking fluid 12, and flight 13b moves the material longitudinally while submerged. The cooked product is lifted out of the cooking fluid at the other end of the drum where it is discharged by spout 13d through a central opening 13e in end wall 13f of drum 13. A collar 13d' mounts the spout 13d on the spiral 13b and also closes the space between the spout and the last turn of the spiral. A fixed spout 14 is mounted on the end wall of container 11 to guide the cooked product into a suitable receptacle, such as shown at 15 in Fig. 1.

End plate 13g of drum 13 at the opposite or inlet end of the drum has centrally mounted therein stub shaft 16 by which drum 13 is rotated. Thus stub shaft rests in and is supported by a half-bearing such as half-collar 17a formed integrally with flange 17 fastened to container 11. Motor 18 is mounted upon base 9 and is arranged to rotate drum 13 at constant speed through a detachable connection such as the tongue and groove coupling elements 19 and 20. Motor 18 may be provided with speed reducing gearing, and change speed gearing, not shown, to rotate drum 13 at different speeds suitable to cooking different products.

The dispensing mechanism for feeding the material in batches intermittently into drum 13 will now be described. The peripheral wall of cylinder 13 adjacent the inlet end is preferably imperforate so as to provide a smooth continuous cylindrical wall portion 13h, which has an inlet opening 21 adjacent end plate 13g that is adapted to register during each revolution of the drum with the open lower end of hopper 22 which is mounted above drum 13. Hopper 22 has downwardly inclined or tapered side walls 22a which converge to define a discharge opening at the bottom of the hopper. At the lower end of the hopper two of these inclined walls at opposite sides of the hopper have arcuate extensions 22b and 22c, as shown particularly in Fig. 2. These arcuate extensions conform to the cylindrical wall 13h of the drum and fit over and within, respectively, the extreme upper ends of adjacent bearing plate 11a. These extensions maintain the discharge opening at the lower end of the hopper in proper relation to rotating cylinder 13 so that the cylindrical wall of the latter holds the charge in hopper 22 at all times when opening 21 is not in registration with the open end of the hopper.

The hopper is supported in part by pivot pin 23 which has its ends in suitable openings in the two side plates of partial housing 24 which is secured to and extends upwardly from base 9 around motor 18. Housing 24 is stationary and consists of a pair of side plates, one at each side of base 9 and a connecting end plate at the end of base 9 adjacent motor 18. When in lowered or operative position as shown in the drawings, the hopper may be held in this position by any suitable supporting means. This is accomplished here by the bearing engagement of arcuate extensions 22b and 22c with the imperforate drum wall portion 13h and by the supporting engagement of the lower ends of said extensions with the upper ends of bearing plate 11a.

Figure 5:
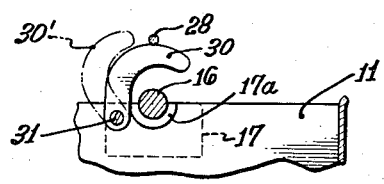
Fig. 5 is a fragmentary sectional view at a larger scale on line 5—5 of Fig. 1.

Mounted on and within drum 13 is a measuring cup or receptacle 25. Cup 25 is immediately underneath and preferably about the same size as inlet opening 21 in the drum wall so that it receives and measures a charge of material to be cooked when the inlet opening registers with the discharge opening in the lower end of hopper 22, at the position shown in Fig. 2. At this position, the lower or inner end of measuring cup 25 is closed by a hinged closure member or gate 26 hinged at 27 to one side of the cup and provided with weight 26a to promote movement of the gate under the influence of gravity and biases the gate toward open position. Rod 28 is attached to the under side of gate 26 and extends through curved slot 29 in end wall 13g of drum 13 to engage cam 30. Cam 30 is pivotally mounted at 31 on the end wall of container 11, as shown best in Fig. 5. The cam is movable to an operating position in which the cam extends over and above stub shaft 16, as shown in Fig. 5 in full lines; and in this operating position the upper side of the cam engages the side of annular half-bearing 17a. This engagement limits the pivotal movement of the cam in a clockwise direction, as viewed in Fig. 5, and determines the normally operating position of the cam. The pivotal mounting of cam 30 permits it to be swung to the position 30' shown in dot-dash lines in Fig. 5 in which position the cam has been moved to one side of shaft 16 permitting drum 13 and the shaft to be lifted upwardly in the event that it is desired to remove the drum from container 11.

Successive positions occupied by measuring cup 25 during a revolution of drum 13 are shown in Figs. 2, 3 and 4, respectively. In Fig. 2, inlet opening 21 in the drum is in full registration with the lower end of the hopper, permitting material to pass from the hopper by gravity into cup 25. Cup 25 is normally filled by this gravity flow, the size of the cup being such that one batch measured out by filling the cup is of the desired size. At this position, bottom closure member 26 is held in closed position by engagement of rod 28 with cam 30, as may be seen in Figs. 2 and 5. Cam 30 is made sufficiently long that this engagement of the rod and cam is maintained until inlet opening 21 has passed entirely beyond the discharge opening of hopper 22. When cup 25, by virtue of rotation of drum 13, has reached or passed the position shown in Fig. 3, rod 28 is moved beyond the cam surface and disengages the cam, thus permitting gate 26 to fall open by gravity as shown in Fig. 3. The material in cup 25 is now free to fall through into the cooking oil in cylinder 13. Slot 29 limits the opening movement of gate 26 by engagement of rod 28 with the end of the slot, as shown in Fig. 3. In this position, closure member 26 acts as a chute to direct the falling material against inclined plate 13j and in front of the end portion 13b' of spiral 13. In this way the material introduced into the drum is directed into position in front of the initial turn of flight 13 which moves the material longitudinally of the drum as the drum rotates while keeping the material fully immersed in the cooking fluid.

As the drum rotates, opening 21 in the drum is moved in a circular path and again approaches the open lower end of hopper 22, as shown in Fig. 4. Rod 28 on the gate again engages the upper surface of cam 30; and the force exerted on the rod by the cam moves gate 26 to a closed position by the time that opening 21 begins to move under hopper 22. In Fig. 4 the gate is shown approaching a fully closed position against the lower end of cup 25.

In order to prevent crushing food material when the trailing edge 21a of inlet opening 21 reaches the position of Fig. 3 and the drum wall completely closes the open end of hopper 22, suitable means are provided in the form of a yieldable wall portion on the hopper. For this purpose, one side wall 22a of the hopper is recessed or cut away at the bottom along the side adjacent the leading edge of cup 25 and opening 21 when in filling position as in Fig. 2. This leaves a gap 22' between the lower edge of the hopper wall and the wall of cylinder 13. The location of the gap may also be defined as at the side of the hopper discharge opening reached by trailing edge 21a of inlet opening as the hopper opening is closed (the position of Fig. 3) by the drum wall. At this point a portion of arcuate extension 22c is disposed in radially spaced relation to the outer surface of drum 13 in order to provide a chamber 22d which is outside of but bounded in part by drum 13 and hopper wall 22a. Within chamber 22d there is pivotally mounted arm 22e which is pivoted at 22f to the chamber wall. Arm 22e carries at its outer end curved gate member 22g which is normally free to swing downwardly under the influence of gravity and rest upon the smooth outer surface of drum section 13h. Member 22g normally closes gap 22' to act as a yielding or movable portion of the hopper wall. As a wall section, member 22g is restrained against movement in a direction tangential or circumferential of drum 13; but at the same time, gate member 22g is free to swing upwardly from the rest position, i. e. in a direction generally radial of the drum, under the pressure of any particles of material which project above the top edge of cup 25 as the filled cup moves from the position of Fig. 2 to that of Fig. 3. In the lower or rest position, member 22g closes the gap 22' between the hopper wall and the periphery of the rotating drum and prevents material from entering chamber 22d; but the ability of this yielding member to yield or move upwardly out of engagement with the periphery of the rotating drum allows particles extending slightly above the top of the cup to pass beneath the member without being crushed. The circumferential length of chamber 22d is substantially equal to or slightly greater than the corresponding dimension of cup 25. As a result, the particles within the cup drop downwardly out of the cup before the cup reaches that portion of arcuate extension 22c which is in engagement with the outside surface of the drum.

It will be understood that inclined plate 13j and end portion 13b' of the spiral flight deflect each charge of material in a direction lengthwise of the drum sufficiently that as cup 25 moves around in its circular path there is no tendency for it to enter the cup. In any event, arcuate extensions 22b and 22c and bearing plate 11a cover opening 21 at all positions of the cup except when it is entirely or in part under the open end of hopper 22 or chamber 22d; and in this way inlet 21 is closed in a manner to prevent discharge of any material from the drum through opening 21.

In order to maintain automatically the proper level of cooking fluid within container 11, reserve tank 32 is provided to hold a reserve supply of fluid. It is connected by pipe 33 to the inside of container 11, pipe 33 extending downwardly to a point just below the normal level of cooking fluid 12. Filling cap 32a on the tank is airtight with the result that fluid passes automatically from reserve tank 32 into container 11 whenever the level of the cooking fluid falls below the end of pipe 33 to admit air into tank 32 through the pipe. Fluid flow may be regulated or stopped by manually operated valve 34.

Heating of the cooking fluid may be accomplished in any suitable manner, as by heating coil 35. The body of cooking fluid may be held at any temperature automatically by suitable thermostatic control means which may include a temperature responsive element 37 immersed in the body of fluid and connected to suitable control means, not shown in the drawings, by pipe 38 which extends upwardly out of the body of fluid at one side of drum 13. Pipe 38 is attached to a supporting post 38a and is preferably provided with a flexible section, such as coil 38a'.

The assembly consisting of food container 11, drum 13, and hopper 22 is enclosed by an outer movable housing member 42. This outer housing consists of two parallel side plates seen in section in Fig. 2, and a top closure member extending between the side plates which also extends down over the discharge end of the drum. Housing 42 has an opening at the end at the position of discharge spout 14 and is also open above hopper 22. Outer housing 42 is pivotally mounted at 43 on the side walls of fixed housing 24. The opening at the top of housing 42 is closed by lid 44 which is hinged at 45 on the rear end wall of fixed housing 24. Access to hopper 22 is easily gained by swinging cover 44 to an open position about hinge 45.

From the foregoing, it will be apparent that my improved form of dispensing apparatus is simple in construction, efficient in operation, and provides various advantages. It enables the material to be cooked to be fed into drum 13 in small batches at regular intervals so that excessive cooling of the cooking fluid is avoided. At the same time the rate of feed is always under control and the advantages of continuous feeding or operation are obtained without any of the complications of the mechanism ordinarily necessary for such feed. A particular advantage is that crushing or breaking of the food particles during the feeding operation is entirely avoided and consequently it is possible to produce at all times a product of uniformly high quality.

Having described a preferred embodiment of my invention, it will be understood that various modifications therein may be made by persons skilled in the art without departing from the spirit and scope of my invention. Consequently it is considered that the foregoing description is illustrative, rather than limitative upon, the appended claims.

I claim:

1. In a batch feeding apparatus, the combination comprising: a hopper for holding a quantity of material to be fed and having a discharge opening at its lower end; a hollow cylinder rotatably mounted beneath the hopper closely adjacent thereto, the wall of the cylinder closing the discharge opening of the hopper to material flow and having an inlet opening adapted to permit material to flow from the hopper into the cylinder by gravity when in registration with the hopper discharge opening; and means at the bottom of the hopper wall at one side of the discharge opening for preventing crushing of material between the cylinder wall and the hopper wall as the trailing edge of the inlet opening cuts off flow of material through the discharge opening.

2. Batch feeding apparatus as in claim 1 in which one stationary wall of the hopper is spaced from the cylinder to form a gap at the side of the discharge opening that is reached by the trailing side of the inlet opening as the hopper opening is closed, and the means for preventing crushing of material includes a movable gate member biased toward a position substantially closing said gap.

3. Batch feeding apparatus as in claim 1 which also includes a measuring cup inside the cylinder receiving material from the hopper through the cylinder inlet opening until filled to measure each batch.

4. Batch feeding apparatus as in claim 3 in which the movable gate member is held against movement circumferential of the cylinder and is free to move in a direction substantially radial of the cylinder when engaged by material in the measuring cup.

5. Batch feeding apparatus as in claim 3 in which the measuring cup has a movable bottom closure member gravity biased to an open position and which also includes cam means engaging the bottom closure member to hold it closed when the cup is in filling position.

GEORGE ASHTON.

No references cited.